United States Patent [19]

Westbrook et al.

[11] Patent Number: 5,389,711
[45] Date of Patent: Feb. 14, 1995

[54] PLASTICISERS FOR SALT FUNCTIONALIZED POLYVINYL AROMATICS

[75] Inventors: Paul A. Westbrook, Houston; Leonard E. Gerlowski, Katy, both of Tex.

[73] Assignee: Shell Oil Company, Houston, Tex.

[21] Appl. No.: 479,898

[22] Filed: Feb. 14, 1990

[51] Int. Cl.⁶ ............................................. C08K 5/09
[52] U.S. Cl. .................... 524/288; 524/293; 524/296; 524/299; 524/505
[58] Field of Search ............... 524/505, 288, 293, 296, 524/299

[56] References Cited

U.S. PATENT DOCUMENTS

| | | | |
|---|---|---|---|
| B1 4,444,953 | 8/1987 | St. Clair | 525/98 |
| Re. 27,145 | 6/1971 | Jones | 260/880 |
| 3,231,635 | 1/1966 | Holden et al. | 260/880 |
| 3,265,765 | 8/1966 | Holden et al. | 260/876 |
| 3,322,856 | 5/1967 | Holden et al. | 260/876 |
| 3,494,942 | 2/1970 | Miki et al. | 260/397.5 |
| 3,634,549 | 1/1972 | Shaw et al. | 260/880 B |
| 3,670,054 | 6/1972 | De La Mare et al. | 260/880 B |
| 3,700,633 | 10/1972 | Wald et al. | 260/880 B |
| 3,847,854 | 11/1974 | Canter et al. | 260/23.7 M |
| 3,870,841 | 3/1975 | Makowski et al. | 260/23.7 R |
| 3,939,242 | 2/1976 | Lundberg et al. | 264/294 |
| 3,976,628 | 8/1976 | Halasa et al. | 526/22 |
| 4,033,888 | 7/1977 | Kiovsky | 252/56 D |
| 4,077,893 | 3/1978 | Kiovsky | 252/56 R |
| 4,118,362 | 10/1978 | Makowski et al. | 260/32.6 |
| 4,137,203 | 1/1979 | Makowski et al. | 260/23.5 A |
| 4,141,847 | 2/1979 | Kiovsky | 252/51.5 A |
| 4,143,185 | 3/1979 | Lundberg et al. | 427/314 |
| 4,145,298 | 3/1979 | Trepka | 252/51.5 A |
| 4,145,379 | 3/1979 | Lundberg | 260/879 |
| 4,191,685 | 3/1980 | Haaf et al. | 524/505 |
| 4,391,949 | 7/1983 | St. Calir | 525/99 |
| 4,536,547 | 8/1985 | Lundberg et al. | 525/186 |
| 4,543,385 | 9/1985 | Agarwal et al. | 524/518 |
| 4,617,337 | 10/1986 | Lundberg et al. | 524/399 |
| 4,840,982 | 6/1989 | Campbell et al. | 524/151 |

FOREIGN PATENT DOCUMENTS 178797 4/1986 European Pat. Off. .

OTHER PUBLICATIONS

C. Bazuin–A. Eisenberg, "Dynamic Mechanical Properties of Plasticized Polystyrene-Based Ionomers", J. Pol. Sc., vol. 24, 1137–1153.

R. D. Lundberg–H. S. Makowski–L. Westerman, "Dual Plasticization of Sulfonated Ionomer", Amer. Chem. Soc., (1980), pp. 68–76.

Primary Examiner—Peter D. Mulcahy

[57] ABSTRACT

The present invention provides an aromatic acid, a salt of an aromatic acid, anhydride of an aromatic acid, or mixtures thereof in which at least 50 percent of the carbon atoms are in aromatic rings and which have a melting point above about 100° C. as a plasticizer for polyvinyl aromatic polymers which are functionalized by grafting salt functional groups onto the polyvinyl aromatic blocks. When such a polymer is plasticized with the aromatic acid, salt of an aromatic acid or anhydride of an aromatic acid of this invention, the polymer retains excellent high temperature physical properties.

13 Claims, No Drawings

PLASTICISERS FOR SALT FUNCTIONALIZED POLYVINYL AROMATICS

FIELD OF THE INVENTION

This invention relates to an improved polymeric composition comprising aromatic acids, salts of aromatic acids or anhydrides of aromatic acids and salt functionalized polymers of monovinyl aromatics.

BACKGROUND OF THE INVENTION

Polymers of styrene have long been known as useful, and in particular, they are known to be useful as block copolymers with conjugated diolefins, such as butadiene and isoprene. These block copolymers are referred to as thermoplastic polymers because they may be worked by heating the polymer to its melting temperature, and then processing by such methods as vacuum forming, extrusion, compression molding, calendering or blow molding. When the styrene content of these polymers is less than about 60 percent by weight, these polymers are also elastic. As elastomers they have good tear resistance, flexibility, thermomechanical stability and other properties.

The thermoplastic properties are the result of incompatibility between the polystyrene and the polydiolefin polymeric blocks which causes separate domains to exist. At service temperatures, the polydiolefin domains are rubbery and elastic, whereas the polystyrene domains are hard and glassy. The polystyrene domains serve as physical crosslinks between the rubbery polydiolefin blocks. This causes the polymer to behave much like a vulcanized rubber at temperatures which are below the polystyrene glass transition temperature. By heating the block copolymer to a temperature greater than the glass transition temperature of the polystyrene domains, the polymer may be processed as a melt and processed.

Although these polymers are processable as a melt formable thermoplastic in commercial polymer handling equipment and have many excellent properties, they have shortcomings. The glass transition temperature of the polystyrene domains limit the polymer's service temperature. Further, these polymers are not compatible with polar engineering thermoplastics, causing difficulty in making polymeric blends with these materials. Adhesion to polar substrates and polar coatings are also generally not good, and organic solvents readily dissolve these polymers.

It has been found that these shortcomings can be partially overcome by incorporating polar functional groups into the polymers. It has been found to be particularly advantageous to incorporate salt functional groups into the polystyrene blocks to increase the polymer's solvent resistance, high temperature properties and tensile strength. Polymers which include salt functionality are commonly refered to as ionomers. Incorporation of salt of sulfonic acid functionality into the styrene blocks of such a polymer may increase the service temperature to 200° C. Incorporation of salts of carbonic acid functionality into the polymers may increase ultimate use temperatures to above 125° C. The same polymer without functionality is limited to service temperatures of about 100° C.

Unfortunately, incorporation of salt functionality into these polymers is detrimental to the processability of these polymers. The ionic interactions which cause the improvements in the polymer's mechanical properties at service temperatures remain active above the glass transition temperature of the polystyrene domains. These ionic interactions interfere with the processability of the polymer melts by raising the viscosities of the melt. Typical plasticizers, such as processing oils, esters and glycerols, improve processability of styrene block functionalized styrene-butadiene block copolymers, but only at the expense of many of the physical properties which the functionalization is intended to improve.

Other ionomers which are difficult to process are also known, and plasticers for some of them have been developed. Terpolymers of ethylene-propylene and diolefins, such as EPDM, which are sulfonated and then neutralized with metal ions to produce salt functionality have been known since the early 1970's. The ionic crosslinks of these polymers serve many of the same functions as the styrene blocks of the styrene-conjugated diene block copolymers. The ionic crosslinks tie polymer chains together to result in properties like vulcanized rubber, but the ionic crosslinks can be broken at elevated temperatures with the aid of a plasticizer. Preferred plasticizers for salts of sulfonated EPDM include zinc stearate and aliphatic organic amides. These plasticizers are taught in U.S. Pat. No. 3,847,854. They are referred to as ionic plasticizers because they function by relaxing ionic bonds. This is in contrast to backbone plastization which is accomplished by enhancing slippage between polymeric backbones.

Zinc stearate can be utilized as a processing aid for styrene functionalized block copolymers of styrene and butadiene, but the physical properties of the functionalized block copolymers, and in particular, physical properties near the polystyrene domain glass transition temperatures are significantly adversely effected because the zinc stearate lowers the glass transition temperature of these domains.

Another family of plasticizers for salts of sulfonated polymers operates by releasing water at processing temperatures. Examples include $CaSO_4 \cdot 2H_2O$, $LiSO_3 \cdot 2H_2O$, $(NH_4)_2SO_4 \cdot Ce(SO_4)_3 \cdot 8H_2O$, $BiO_2 \cdot 2H_2O$ and $FeF_2 \cdot 8H_2O$. Processing aids which release water at elevated temperatures are also taught in U.S. Pat. No. 3,847,854. The water released from these plasticizers is retained in the polymer melt while the polymer is under a high pressure, such as in an extruder. When a polymer melt exits a region of high pressure, the water is released from the melt. The use of this family of plasticizers therefore does not allow reprocessing without addition of more plasticizer.

Other known plasticizers for functionalized elastomers include dioctyl phthalate (DOP), dioctyl sebacate, dibutyl phthalate (DBP), diethyl phthalate (DEP), and dioctyl succinate. These plasticizers are liquids at room temperature. When incorporated into compositions of ionomers of polystyrene they cause the glass transition temperature to decrease and therefore result in a deterioration of high temperature mechanical properties. Low molecular weight amines are also known as processing aids for ionomers, but the use of low molecular weight amines also causes the glass tranition temperature of ionmerized polystyrene to decrease.

It is therefore an objective of the present invention to provide a plasticizer for functionalized monovinyl aromatic polymers which does not significantly reduce the high temperature properties of the polymer. In another aspect, it is an objective of this invention to provide a composition comprising such a polymer and a plasticizer which may be processed at temperatures typical of commercial polymer processing equipment.

SUMMARY OF THE INVENTION

The objectives of the present invention are accomplished by providing an aromatic acid, a salt of an aromatic acid, an anhydride of an aromatic acid, or a mixture thereof which has a melting point above about 100° C. as a plasticizer for a functionalized polymer, the functionalized polymer comprising vinyl aromatic monomer units. The functional groups of the polymer comprise salt functionality. When these functionalized polymers are plasticized with an aromatic acid, a salt of an aromatic acid, an anhydride of an aromatic acid, or a mixture thereof the polymer retains excellent high temperature physical properties.

In a preferred embodiment, the aromatic acid is an aromatic diacid which is capable of forming an anhydride. The most preferred aromatic diacids are ortho phthalic acid and 1,7-naphthalic acid.

DETAILED DESCRIPTION OF THE INVENTION

The functionalized polymer comprising vinyl aromatic monomer units may be a homopolymer, random copolymer, tapered copolymer, or block copolymer. The functional groups may be incorporated into the polymer by grafting the functional groups to vinyl aromatic hydrocarbon units or alternatively by copolymerizing functional group containing monomers with vinyl aromatic monomer units. It is prefered that the polymer be a functionalized copolymer with at least one conjugated diolefin, and most prefered that the polymer be a functionalized block copolymer with at least one conjugated diolefin. In the most prefered embodiment the functionalized polymer is prepared by grafting functional groups to a base block copolymer. The base block copolymer will comprise at least one polymeric block containing predominantly monovinyl aromatic hydrocarbon monomer units and at least one polymeric block containing predominantly conjugated diolefin monomer units. The block copolymer may be linear, branched, coupled or radial because the invention does not depend on any specific geometrical structure, but rather on the chemical constituents of each of the polymer blocks.

The block copolymer may be produced by any block polymerization procedure including sequential addition of monomer techniques, incremental addition of monomer techniques, or various coupling techniques. Tapered copolymer techniques may also be used.

Useful linear block copolymers include linear block copolymers such as those described in U.S. Pat. Nos. 3,231,635; 3,265,765 and 3,322,856, which are incorporated herein by reference. In general, linear and branched block copolymers include those that may be represented by the general formula:

wherein:
A is a linear or branched polymeric block comprising predominantly vinyl aromatic hydrocarbon monomer units (referred to as Block A);
B is a linear or branched polymeric block containing predominantly conjugated diolefin monomer units (referred to as Block B);
x and z are, independently, a number equal to 0 or 1; and
y is a whole number ranging from 1 to about 20.

Radial block copolymers include polymers of the type described in U.S. Pat. Nos. 4,033,888; 4,077,893; 4,141,847; 4,391,949 and 4,444,953, which are also incorporated herein by reference. Coupled and radial block copolymers include those that may be represented by the general formula:

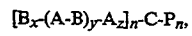

wherein:
A, B, x, y and z are as previously defined;
n and n' are, independently, numbers from 1 to about 40 such that
n+n'≧3;
C is the core of the coupled or radial polymer formed with a polyfunctional coupling agent having two or more functional groups; and
each P is the same or a different polymer block or polymer segment having the general formula:

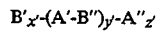

wherein:
A" is a polymer block containing predominantly vinyl aromatic hydrocarbon monomer units which may be the same or different from A;
B' is a polymer block containing predominantly conjugated diolefin monomer units which may be the same or different from B;
A'-B" is a polymer block containing vinyl aromatic hydrocarbon monomer units (A') and conjugated diolefin monomer units (B"), the
A'-B" monomer units may be random, tapered or block and when each of A' and B" is blocked, the A' block may be the same or different from A" and B" may be the same or different from B';
x' and z' are, independently, numbers equal to 0 or 1; and
y' is a number from 0 to about 20, with the proviso that the sum of x' plus y' plus z' is greater than or equal to 1.

The coupled and radial polymer may, then, be symmetric or asymmetric.

Blocks A and B may be either homopolymer, random or tapered copolymer blocks as long as each block predominates in at least one class of the monomers characterizing the blocks defined herein before. Thus, blocks A may comprise styrene/alpha-methylstyrene copolymer blocks or styrene/butadiene random or tapered copolymer blocks as long as the blocks individually predominate in vinyl aromatics. The A blocks are preferably vinyl aromatic homopolymeric blocks. The term "monovinyl aromatic" will be taken to include particularly those of the benzene series such as styrene and its analogs and homologs including alpha-methylstyrene and ring alkylated styrenes, particularly ring-methylated styrenes, and other vinyl polycyclic aromatic compounds such as vinyl naphthalene and the like. The preferred vinyl aromatics are styrene and alpha-methylstyrene, and styrene is particularly preferred.

The block B may comprise homopolymers of conjugated diene monomers, copolymers of two or more conjugated dienes, and copolymers of one of the dienes with a monoalkenyl aromatics as long as the block B predominates in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

As used in connection with polymer block composition, "predominantly" shall mean that the specified monomer or monomer type shall constitute at least about 85 wt % of the total monomer content of that block.

The base block copolymers of conjugated dienes and monovinyl aromatics which may be utilized in this invention include polybutadiene block containing copolymers which have a polybutadiene 1,2-microstructure content of from about 7% to about 100%, preferably from about 25 to about 65%, more preferably 35 to 55%.

Block copolymers useful in this invention may contain various ratios of conjugated dienes to monovinyl aromatics. The proportion of the monovinyl aromatic blocks in these block copolymers will preferably be between about 1 and about 60 weight percent by weight and more preferably between about 5 and about 40 percent by weight.

The number average molecular weights of the individual blocks may vary within certain limits. In most instances, the monovinyl aromatic blocks will have number average molecular weights in the order of about one monovinyl aromatic monomer unit per block to a number average molecular weight of about 125,000, and preferably between number average molecular weights of about 1,000 to about 60,000. Conjugated diene blocks, when they are present, will have number average molecular weights in the order of about 10,000 to about 450,000, and preferably about 10,000 to about 150,000. These molecular weights are most accurately determined by gel permeation chromatography and/or low angle light scattering techniques.

The base block copolymer may optionally be hydrogenated. Hydrogenation improves thermal, oxidative and U.V. stability of conjugated diolefin containing polymers. When the base block copolymer is hydrogenated, selective hydrogenation is preferred. Selective hydrogenation refers to hydrogenation of the ethylenic unsaturation while the aromatic saturation is not hydrogenated.

Hydrogenation of the polymer may be accomplished using any of the methods known in the prior art. The hydrogenation will preferably be selective hydrogenation accomplished using a method such as those taught in U.S. Pat. Nos. 3,494,942; 3,634,549; 3,670,054; 3,700,633 and Re 27,145, which are incorporated herein by reference. Most preferably, selective hydrogenation will be accomplished using one of the processes taught in U.S. Pat. No. 3,700,633. These hydrogenation processes involve the use of a suitable catalyst, particularly a catalyst or catalyst precursor comprising an iron group metal compound. In the methods described in the foregoing patents, the catalyst is prepared by combining an iron group metal, particularly a nickel or cobalt compound with a suitable reducing agent such as an aluminum alkyl. The preferred iron group metal compounds are carboxylates and alkoxides.

The block copolymers are preferably selectively hydrogenated so as to convert (hydrogenate) at least about 80 percent and most preferably greater than 98 percent of the initial ethylenic unsaturation. Preferably, less than 10 percent and most preferably less than 2 percent of the initial aromatic unsaturation is hydrogenated.

The incorporation of the carboxyl functional group into the aromatic portion of the block copolymer may be accomplished by first metalating the base block copolymer in a manner such as that taught in U.S. Pat. No. 3,976,628, which is incorporated herein by reference. This process includes reacting the base block copolymer with a metal alkyl, such as s-butyl lithium. The reaction of the metal alkyl with the vinyl arene containing polymer results in addition of the metal ion to an aromatic group, replacing a hydrogen, and releasing an alkane. When ethylenic unsaturation exists in the base block copolymer, some metal ions will also be added in positions allyl to the ethylenic unsaturation.

Functionalization of the polymer in this manner will, generally, be accomplished in a solution with an inert solvent. Suitable solvents include straight- and branched-chain hydrocarbons such as pentane, hexane, heptane, octane and the like, as well as alkyl-substituted derivatives thereof, and cycloaliphatic hydrocarbons such as cyclopentane, cyclohexane, cycloheptane and the like as well as alkyl-substituted derivatives thereof. Aromatic, substituted aromatic, and olefinic hydrocarbons are generally not acceptable as solvents because they will have a tendency to metalate along with the block copolymer.

Metalation of the base block copolymer is preferably accomplished in the presence of a polar metalation promoter. Although the metalation can take place without the polar metalation promoter, the reaction requires either extended time periods or excessive temperatures. The polar metalation promoters include a variety of tertiary amines, bridgehead amines, ethers, and metal alkoxides. The tertiary amines useful in the metalation step have three saturated aliphatic hydrocarbon groups attached to each nitrogen.

Functionalization with carboxylic functionality is completed by reacting the metalated polymer with carbon dioxide or another electrophile such as those taught in U.S. Pat. No. 4,145,298, which is incorporated herein by reference. The reaction product of the metalated polymer and the carbon dioxide is a carboxylic acid salt. The lithium salt can be converted to an acid by contacting the functionalized hydrogenated block copolymer with an acid. A most preferred acid is acetic acid due to its excellent solubility in acceptable solvents for the metalated block copolymer.

Block copolymers of monoalkenyl aromatics and conjugated diolefins which have sulfonic functionality grafted in the monoalkenyl aromatic blocks may be prepared by the method described in U.S. Pat. No. 3,870,841, which is incorporated herein by reference. The preferred method of grafting sulfonic functionality to the monoalkenyl aromatic blocks is by reacting the block copolymer with acyl sulfate ($RCO_2SO_3H$), which adds a —$SO_3H$ group to the aromatic ring of the polymer, and releases the organic acid ($RCO_2H$). The preferred acyl sulfate is acetyl sulfate in which R is a methyl group. This reaction requires the absence of water since water will react with the acyl sulfate producing sulfonic acid and the organic acid.

Acyl sulfates are preferably prepared in situ, due to the propensity of acyl sulfates to sulfonate themselves by the following reaction:

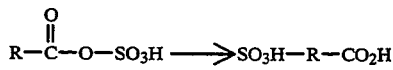

A preferred method for preparing acyl sulfates in situ is to react acetic anhydride with sulfuric acid according to the following reaction:

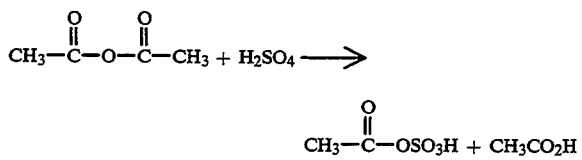

Utilization of an excess of acetic anhydride has the additional advantage of scavenging trace amounts of water which may be present. Sulfonated polymers may then be neutralized to form salts by reaction with metal hydroxides, or by reaction with metal acetates.

The plasticizer must comprise at least one aromatic hydrocarbon ring, and at least one functional group selected from the group of acid, salt and anhydride. The functional group may be attached to the aromatic ring, or to a pendent hydrocarbon group. The aromatic ring may optionally be further substituted with alphatic hydrocarbon groups, aromatic groups, or ether, ester, aliphatic or carbonyl linkages to other organic radicals.

The plasticizer of the present invention must be preferentially compatible, at low concentrations and elevated temperatures, with the functionalized polyvinyl aromatic phase over a phase of plasticizer so that the plasticizer will not form seperate domains and not be available to polymeric ion bonds. Further, if the polymer is a block copolymer comprising polydiolefins blocks, the plasticizer must be preferentially compatible, at low concentrations and elevated temperatures with the polyvinyl aromatic phases over the polyconjugated diolefin phase. The elevated temperatures are between the glass transition temperature of the polystyrene domains and the processing temperatures. This compatibility must be considered at low concentrations because the functionalized polyvinyl aromatic phase will become saturated with the plasticizer at high concentrations and the plactizer will form a seperate phase. Low concentrations of plasticizer are generally less than about one mole of plasticizer for each 10 functional groups on the polyvinyl arene polymer blocks. Fatty acids and salts of fatty acids are not preferentially compatibe. Plasticizers which are preferentially compatible generally have at least 50% of the carbon atoms of the plasticizer in aromatic rings.

The plasticizer of the present invention must have a melting temperature above 100° C. in order to not significantly lower the glass transition of the functionalized polymerized monoalkenyl aromatic domains, and thereby detrimentally effect high temperature properties of the polymeric composition. It is further preferred that the plasticizer have a melting temperature which is greater than the glass transition temperature of the functionalized block copolymer's poly monoalkenyl aromatic block phase and less than the desired processing temperatures. The plasticizers of the present invention will therefore be liquid during the processing of the ionomer and solid at temperatures below the polystyrene glass transition temperatures. Processing temperatures which limit the melting temperatures of the plasticizers of this invention range from 100° to 350° C.

Acceptable plasticizers include benzoic acid, toluic acid, ethylbenzoic acid, t-butylbenzoic acid, n-pentylenzoic acid, and n-heptylbenzoic acid. Ammonium salts of these acids are acceptable as the aromatic acid salts of the present invention as are other salts which meet the melting temperature limitations. Toluic acid and t-butylbenzoic acid are preferred due to their high melting temperatures, 180° C. and 165° C., respectively, and excellent compatibility with the functionalized polystyrene domains.

Low molecular weight plasticizers are prefered as the plasticizers of this invention. Low molecular weight plasticizers have lower viscosities at temperatures above their melt temperatures, and diffuse through the polymeric melts at higher rates. Plasticizers having molecular weights less than about 1000 are generally low enough in molecular weight to have these advantages.

The most preferred plasticizers of the present invention are dicarboxylic acids which are capable of forming an anhydrides, such as ortho phthalic and 1,7-naphthalic acids. It is theorized that the unexpected effectiveness of dicarboxylic acids which are capable of forming anhydrides may be due to the fact that the diacid forms the anhydride and water during processing. The water which is formed may solvate ionic bonds, allowing much easier disassociation of the bonds and thereby enhance molecular flow. The anhydride-dicarboxylic acid-water combination will exist in the polymer melt in an equilibrium at elevated temperatures. At lower temperatures, the equilibrium will favor the dicarboxylic acid form and thus water will be removed from the ionic crosslinks. This results in some retention of the reprocessibility of the plasticized polymer. The formation of water from diacids is also relatively slow, when compared to the release of water from typical hydrate plasticizers. The effectiveness of the diacids as plasticizers therefore lasts for a longer period of time than the typical hydrate plasticizers.

The amount of plasticizer preferred is a molar ratio of from about 0.05:1 to about 20:1 of plasticizer to polyvinyl aromatic functional groups. More preferably, this ratio is from about 0.2:1 to about 5:1 and most preferably this ratio is from about 0.5:1 to about 2:1. Larger ratios are acceptable as plasticizers, but tend to be detrimental to ultimate mechanical properties of the functionalized block copolymer. Larger ratios also tend to form separate plasticizer domains within the polymer, and not be effective in plasticizing ionic crosslinks. Domains of plasticizer tend to form above a ratio of about 1:1 and marginally increasing the amount of plasticizer above this level results in decreasing marginal improvements in processability. Lesser amounts do decrease the viscosity of polymeric melts of the functionalized block copolymers, but do not reduce the viscosity by the desired amount.

The plasticizer may be added to the functionalized block copolymer by any known means. Solution blending is preferred over melt blending due to the difficulty of melt processing the functionalized block copolymers prior to the addition of the plasticizer. Although solution blending is preferred, dry blending, milling, kneading, Banbury mixing, plasticating extrusion, and the like are acceptable.

The composition of the present invention may, of course, further comprise additives and components known to be useful in elastomeric block copolymer composition such as homopolymers or copolymers of alpha olefins or aromatics, fillers, pigments, extender oils, stabilizers, antioxidants, flame retardants, mold release agents and/or crosslinking agents.

The use of the plasticizers of the present invention permits processing of ionomers of polyvinyl aromatics without a significant reduction in the glass transition temperature of the ionomer. This results in retention of mechanical properties to higher temperatures. The modulues of the ionomer is also marginally increased, and solvent resistance of the ionomers is improved.

EXAMPLES

A base block copolymer of styrene and butadiene was utilized in each of the following examples. The base block copolymer had a number average molecular weight of about 52,000 and was 29% by weight styrene. The block copolymer had a polystyrene-polybutadiene-polystyrene structure. The end blocks were of approximately equal molecular weight. The polymer was selectively hydrogenated. More than 99 percent of the initial ethylenic unsaturation became hydrogenated while more than 99 percent of the initial aromatic unsaturation remained after hydrogenation. The base hydrogenated block copolymer is referred to as "copolymer A."

A sample of the hydrogenated base block copolymer was carboxylated by metalation with s-butyl lithium, and then reacted with carbon dioxide. The carboxylated block copolymer had 1.13 percent by weight functionality as —COOH. The "raw" carboxylated block copolymer was in the form of a carboxylic acid which was about 20% neutralized as the lithium salt of carboxylic acid. This copolymer is referred to as "copolymer B". A sample of copolymer B was acidified to all acid functionality by contacting copolymer B with acetic acid in a cyclohexane solution. This copolymer will be referred to as "copolymer C." Another sample of copolymer B was treated with NaOH to produce a sample in which the functionality was carboxylic sodium salt. This copolymer will be referred to as "copolymer D."

Another sample of copolymer A was sulfonated by reaction with acetyl sulfate, the acetyl sulfate having been prepared by reaction of an excess of acetic anhydride with sulfuric acid. The sulfonated block copolymer contained 1.15 percent by weight —SO$_3$H groups. A sample of the sulfonated block copolymer was further treated with sodium hydroxide to produce a sodium salt of the sulfonated block copolymer. This copolymer is referred to as "copolymer E."

Plasticizers used for these examples included benzoic acid (BA), toluic acid (TA), phthalic acid (PA), and phthalic anhydride (PH). The plasticizers were blended with the polymers by solution blending. The solution blending was performed by dissolving a sample of the polymer in toluene or tetrahydrofuran, adding the plasticizer, and then vaporizing the solvent by holding the mixture at a temperature of about 60° C. under a vacuum for at least two days.

Relative viscosities of samples were determined by a squeezing flow test. This test was performed by placing five grams of elastomer sample in a hot press between two TEFLON ® coated aluminum foils. The elastomer sample was pressed between two heated platens with a force of 10,000 pounds for two minutes at 200° C. The area of the pressed film was measured to determine the relative amount of flow. The relative viscosity of two Newtonian fluids in a squeezing flow experiment is approximately the ratio of the respective areas raised to the negative fourth power, which is the basis for the estimate of relative viscosity from this test. Polymer melts are known to be generally non-Newtonian, but because the shear rate is low in the squeezing flow test, the Newtonian flow assumption is not a significant source of error in this estimate.

Samples for testing of mechanical properties were prepared from the pressed films from the squeezing flow test. The pressed films were annealed at 80° C. for at least four hours in order to relieve internal stresses resulting from the melt pressing operation. The films were then cut to generate samples for dynamic mechanical analysis and tensile testing.

Glass transition temperatures and relative dynamic moduli, were determined by dynamic mechanical analysis which was conducted on a Rheovibron with an oscillation rate of 11 Hertz.

Room temperature (21° C.) and 110° C. tensile strengths were determined using samples cut with an ASTM microtensile die. The specimens were punched from the annealed films described above.

Twenty-three compositions were prepared by solvent blending the copolymers described above with the plasticizers described above. Table 1 lists the contents, the ratio of plasticizer to functionality, and the squeeze flow relative viscosity for each composition. The glass transition temperature, modulus, ultimate tensile strength, and elongation at break which were determined are also listed in Table 1.

TABLE 1

| | Copolymer | Function | Plasticizer | Moles Plasticizer: Moles Functionality | Squeeze Flow Relative to Non-Plasticized Copolymer | Polystyrene Phase Tg °C. |
|---|---|---|---|---|---|---|
| 1 | A | None | — | — | 1. | 100 |
| 2 | B | 80% acid | — | — | 1.0 | 125 |
| 3 | B | " | TA | 5:1 | 0.25 | 125 |
| 4 | B | " | TA | 2.7:1 | 0.17 | 125 |
| 5 | B | " | TA | 1.4:1 | 0.22 | 125 |
| 6 | B | " | TA | 1:1 | 0.20 | 125 |
| 7 | B | " | TA | 1:1.5 | 0.23 | 125 |
| 8 | B | " | TA | 1:1.8 | 0.25 | 125 |
| 9 | B | " | TA | 1:5 | 0.24 | 125 |
| 10 | B | " | BA | 1:5 | 0.24 | 123 |
| 11 | B | " | BA | 1:1 | 0.15 | 121 |
| 12 | B | " | BA | 5:1 | 0.02 | — |
| 13 | C | All acid | None | — | 1.0 | 125 |
| 14 | C | All acid | BA | 1:2 | 1.0 | 125 |
| 15 | C | All acid | PA | 1:1 | 1.10 | — |

TABLE 1-continued

| | | | | | | |
|---|---|---|---|---|---|---|
| 16 D | Na+ | PA | 1:1 | 0.03 | 125 | |
| 17 D | Na+ | PA | 1:2 | 0.08 | — | |
| 18 D | Na+ | PA | 1:5 | 0.06 | 125 | |
| 19 D | Na+ | PAH | 1:1 | 0.04 | 125 | |
| 20 D | Na+ | TA | 1:1 | 0.05 | 130 | |
| 21 E | Na+ | TA | 1:1 | 0.04 | 135 | |
| 22 E | Na+ | TA | 1:2 | 0.04 | — | |
| 23 E | Na+ | PA | 1:1 | 0.04 | 135 | |

| | Modulus | | | Ultimate Tensile Strength | | | Elongation | |
|---|---|---|---|---|---|---|---|---|
| Copolymer | 23° C. psi | 120° C. psi | 200° C. psi | 23° C. psi | 120° C. psi | 200° C. psi | 23° C. psi | 110° C. psi |
| 1 A | 5230 | 4560 | — | 2900 | 68 | — | 625 | 55 |
| 2 B | — | — | — | 4020 | 185 | — | 725 | 390 |
| 3 B | — | — | — | — | — | — | — | — |
| 4 B | — | — | — | — | — | — | — | — |
| 5 B | — | — | — | — | — | — | — | — |
| 6 B | 9600 | 1900 | — | 2500 | 320 | — | 700 | 220 |
| 7 B | — | — | — | — | — | — | — | — |
| 8 B | — | — | — | — | — | — | — | — |
| 9 B | 10160 | 1320 | — | 278 | 134 | — | 630 | 120 |
| 10 B | 4500 | 570 | — | 1670 | 130 | — | 800 | 230 |
| 11 B | 12600 | 610 | — | 2800 | 320 | — | 630 | 120 |
| 12 B | 15000 | — | — | — | — | — | — | — |
| 13 C | 3470 | 321 | — | 3220 | 90 | — | 660 | 75 |
| 14 C | 4750 | 300 | — | 2460 | 260 | — | 665 | 60 |
| 15 C | — | — | — | — | — | — | — | — |
| 16 D | 3740 | 220 | 90 | 3800 | 90 | 8 | 700 | 60 |
| 17 D | 2060 | 340 | — | 3000 | 75 | — | 680 | 50 |
| 18 D | 5780 | 490 | — | 3100 | 90 | — | 640 | 50 |
| 19 D | 3800 | 400 | — | 3600 | 140 | — | 700 | 85 |
| 20 D | — | — | — | — | — | — | — | — |
| 21 E | 875 | 360 | 160 | 2200 | 100 | 50 | 860 | 50 |
| 22 E | 1060 | 440 | 205 | 3090 | 134 | 60 | 900 | 70 |
| 23 E | 1040 | 463 | 200 | 2670 | 170 | 55 | 740 | 120 |

For the copolymers tested, the viscosity at 200° C. must be reduced by the plasticizer to about 0.25 times the non-plasticized copolymer to permit effective processing of the copolymer in commercial processing equipment. It can be seen from the data in Table 1 that this was accomplished at plasticizer levels utilized when the polymer contained salt functionality. The data in Table 1 demonstrates an unexpected difference in effectivness of the plasticizers of this invention in plasticizing salt vs. acid functional group containing polymers.

Table 1 also lists the mechanical properties of the copolymers with the varying level of different plasticizers. From Table 1 it can be seen that the aromatic acid plasticizers had an effect on the physical properties of the copolymers but the polymeric compositions still have very acceptable mechanical properties.

Torque measurments from a Brabender Plasti-Corder mixer were used to indicate the relative improvement in processability resulting from using toluic acid and phthalic acid as plasticizers for copolymer D (Na salt functionalized polymer). The polymer was loaded into the Brabender and heated to about 240° C. The mixer was then started, and the torque recorded as a function of time. The plasticizer was added in two equal increments of 1.5 PHR, which corresponds to a TA to functional group ratio of 1:1 and a PA to functional group ratio of 0.81:1. The addition of TA reduced the torque by 40 percent and the addition of PA reduced the torque by over 60 percent. The reduction of the torque of this test demonstrates the effectiveness of these compounds as plasticizers and demonstrates the greater effectivness of PA over TA.

A sample of copolymer B which had been converted to the zinc salt form (copolymer F) was combined with zinc stearate to demonstrate the effect of zinc stearate on the mechanical properies of the polymeric composition. Compositions of 10 and 30 percent by weight zinc sterate based on the total compositions were prepared. The tensile strength at 100° C. was determined for each, for the non-plasticized copolymer, and for the unfunctionalized copolymer, copolymer A. The results are summarized in Table 2. It can be seen from the results in Table 2 that the tensile strength of the composition deteriorate unacceptably when zinc sterate is incorporated into a composition of a functionalized polymer of styrene.

TABLE 2

| Copolymer | % w Zn Stearate | Tensile Strength |
|---|---|---|
| A | 0 | 40 |
| B | 0 | 270 |
| B | 10 | 90 |
| B | 30 | 50 |

We claim:

1. A polymeric composition comprising:
a) a functionalized block copolymer comprising at least two blocks comprising predominantly monovinyl aromatic hydrocarbon units, and at least one hydrogenated block comprising predominantly conjugated diolefin hydrocarbon units, wherein salt functional groups are grafted onto the blocks which comprise predominately monovinyl aromatic hydrocarbon units; and
b) a plasticizer selected from the group consisting of phthalic acid, napthalic acid, phthalic anhydride, naphthalic anhydride, salts of phthalic acid, salts of naphthalic acid, and mixtures thereof, the plasticizer having a melting temperature above about 100° C.

2. The composition of claim 1 wherein hydrogenation of the hydrogenated block has saturated at least 80% of the original ethylenic unsaturation.

3. The composition of claim 2 wherein the hydrogenation is a selective hydrogenation, and at least 90% of the original aromatic unsaturation remains after hydrogenation.

4. The composition of claim 1 wherein the functionalized block copolymer comprises between about 1 and about 60 weight percent of the blocks which comprise predominantly monovinyl aromatic hydrocarbon units.

5. The composition of claim 1 wherein the monovinyl aromatic is styrene.

6. The composition of claim 1 wherein the conjugated diolefin is butadiene.

7. The composition of claim 1 wherein the conjugated diolefin is isoprene.

8. The composition of claim 1 wherein the plasticizer is present in a mole ratio of between 0.05:1 and 20:1 based on moles of plasticizer to moles of functional groups.

9. The composition of claim 1 wherein the plasticizer is present in a mole ratio of between 0.5:1 and 2:1 based on moles of plasticizer to moles of functional groups.

10. The composition of claim 1 wherein the plasticizer is selected from the group consisting of ortho phthalic acid and 1,7-naphthalic acid.

11. The composition of claim 1 wherein the functionalized block copolymer is a triblock functionalized block copolymer comprising end blocks which are predominantly styrene blocks and a hydrogenated midblock which is predominantly a hydrogenated butadiene block.

12. The composition of claim 1 wherein the salt functional groups are a salt of a carboxylic acid.

13. The composition of claim 1 wherein the salt functional groups are a salt of a sulfonic acid.

* * * * *